US012586610B2

(12) United States Patent
Li et al.

(10) Patent No.: US 12,586,610 B2
(45) Date of Patent: Mar. 24, 2026

(54) METHOD, APPARATUS, DEVICE, STORAGE MEDIUM AND PROGRAM PRODUCT FOR VIDEO GENERATION

(71) Applicant: Beijing Zitiao Network Technology Co., Ltd., Beijing (CN)

(72) Inventors: Xinwei Li, Beijing (CN); Jiajin Cao, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 3 days.

(21) Appl. No.: 18/573,097

(22) PCT Filed: May 9, 2023

(86) PCT No.: PCT/CN2023/093089
§ 371 (c)(1),
(2) Date: Dec. 21, 2023

(87) PCT Pub. No.: WO2023/217155
PCT Pub. Date: Nov. 16, 2023

(65) Prior Publication Data
US 2024/0296871 A1 Sep. 5, 2024

(30) Foreign Application Priority Data

May 10, 2022 (CN) .......................... 202210508063.2

(51) Int. Cl.
*G11B 27/00* (2006.01)
*G06T 11/60* (2006.01)
(Continued)

(52) U.S. Cl.
CPC ............ *G11B 27/036* (2013.01); *G06T 11/60* (2013.01); *G11B 27/10* (2013.01)

(58) Field of Classification Search
CPC ....... G11B 27/00; G11B 27/02; G11B 27/029; G11B 27/036; G11B 11/00
(Continued)

(56) References Cited

U.S. PATENT DOCUMENTS 11,244,488 B2 * 2/2022 Watanabe .............. G06V 20/52
11,722,727 B2 * 8/2023 Li ...................... H04N 21/2743
386/280
(Continued)

FOREIGN PATENT DOCUMENTS

CN 109756751 A 5/2019
CN 110121103 A 8/2019
(Continued)

OTHER PUBLICATIONS

Communication pursuant to Rules 70(2) and 70a(2) EPC for European Application No. 23802924.3, mailed Oct. 22, 2024, 1 page.
(Continued)

*Primary Examiner* — Daquan Zhao

(57) ABSTRACT

Embodiments of the present disclosure relates to a method, apparatus, device, storage medium, and program product for video generation. The method comprises: generating initial multimedia data based on received text data; obtaining a target editing template in response to an editing template obtaining request; applying the editing operation indicated by the target editing template to the initial multimedia data to obtain target multimedia data; and generating target video based on the target multimedia data. Embodiments of the present disclosure generates video by directly applying the editing operation in the obtained editing template to the multimedia data, without the need for users to manually clip the video. This can not only reduce the time cost of video production, but also improve the quality of video production.

16 Claims, 3 Drawing Sheets

(51) Int. Cl.

| | |
|---|---|
| *G11B 27/02* | (2006.01) |
| *G11B 27/036* | (2006.01) |
| *G11B 27/10* | (2006.01) |
| *G11B 27/029* | (2006.01) |

(58) Field of Classification Search

USPC ................ 386/278, 280, 282, 285, 239, 248

See application file for complete search history.

(56) References Cited

U.S. PATENT DOCUMENTS

| | | | | |
|---|---|---|---|---|
| 12,154,598 | B1 * | 11/2024 | Warnick | ............... G06V 40/161 |
| 2018/0143741 | A1 * | 5/2018 | Uriostegui | .............. G06F 16/48 |
| 2022/0044026 | A1 | 2/2022 | Huang | |
| 2022/0130427 | A1 * | 4/2022 | Allibhai | .................. G10L 25/57 |

FOREIGN PATENT DOCUMENTS

| | | |
|---|---|---|
| CN | 111243632 A | 6/2020 |
| CN | 111460183 A | 7/2020 |
| CN | 112449231 A | 3/2021 |
| CN | 112579826 A | 3/2021 |
| CN | 110572722 B | 4/2021 |
| CN | 112738623 A | 4/2021 |
| CN | 113452941 A | 9/2021 |
| CN | 113473182 A | 10/2021 |
| CN | 114339399 A | 4/2022 |
| JP | 2021033367 A | 3/2021 |
| JP | 2021069117 A | 4/2021 |

OTHER PUBLICATIONS

Extended European Search Report for European Application No. 23802924.3, mailed Oct. 2, 2024, 8 pages.

Notice of Reasons for Refusal issued in JP Appl. No. 2023-578709 dated Jan. 21, 2025, English translation (14 pages).

"Home TV series movies variety shows", Video production, Retrieved from the link: "https://v.youku.com/video?vid=XNTEzNjgzMTUyNA%3D%3D", 2025, pp. 1-2.

Office action received from Chinese patent application No. 202210508063.2 mailed on Jun. 17, 2025, 16 pages (8 pages English Translation and 8 pages Original Copy).

* cited by examiner

| |
|---|
| GENERATE INITIAL MULTIMEDIA DATA BASED ON RECEIVED TEXT DATA — S101 |
| OBTAIN A TARGET EDITING TEMPLATE IN RESPONSE TO AN EDITING TEMPLATE OBTAINING REQUEST — S102 |
| APPLY EDITING OPERATION INDICATED BY THE TARGET EDITING TEMPLATE TO THE INITIAL MULTIMEDIA DATA TO OBTAIN TARGET MULTIMEDIA DATA — S103 |
| GENERATE TARGET VIDEO BASED ON THE TARGET MULTIMEDIA DATA — S104 |

60

APPARATUS FOR VIDEO GENERATION

INITIAL MULTIMEDIA DATA
GENERATION MODULE

61

TARGET EDITING
TEMPLATE OBTAINING
MODULE

62

TARGET VIDEO
GENERATION MODULE

64

TARGET MULTIMEDIA DATA
GENERATION MODULE

63

700

701
PROCESSING
DEVICE

702
ROM

703
RAM

704

705

I/O INTERFACE

706
INPUT DEVICE

707
OUTPUT DEVICE

708
STORAGE
DEVICE

709
COMMUNICATION
DEVICE

METHOD, APPARATUS, DEVICE, STORAGE MEDIUM AND PROGRAM PRODUCT FOR VIDEO GENERATION

This application claims priority to the Chinese Invention Patent Application No. 202210508063.2 titled "Method, Apparatus, Device, Storage Media and Program Product for Video Generation" filed on May 10, 2022.

FIELD

The present disclosure relates to the field of video processing technology, and specifically, to a method, apparatus, device, storage medium, and program product for video generation.

BACKGROUND

With the rapid development of computer technology and mobile communication technology, various video platforms based on electronic devices have been widely used, greatly enriching people's daily lives. More and more users are willing to share their video works on video platforms for other users to watch.

In related technologies, when making a video, users first need to search for various materials needed in the video themselves, and then perform a series of complex video editing operations on the materials to ultimately generate a video work.

If users lack editing experience, the time cost of making videos will increase, and the quality of the produced videos will not be high.

SUMMARY

In order to solve the above technical problems, the disclosed embodiment provides a method, apparatus, device, storage medium, and program product for video generation, which directly applies the editing operation in the obtained editing template to multimedia data to generate videos without the need for users to manually edit videos. As such, the time cost of video production is reduced while the quality of video production is improved.

In a first aspect, the present disclosure provides a method of video generation comprising: generating initial multimedia data based on received text data, wherein the initial multimedia data comprises spoken speech of the text data and a video image matching the text data, the initial multimedia data comprising at least one multimedia segment, the at least one multimedia segment is respectively corresponding to at least one text segment divided from the text data, a target multimedia segment in the at least one multimedia segment is corresponding to a target text segment in the at least one text segment, the target multimedia segment comprises a target video segment and a target speech segment, the target video segment comprises a video image matching the target text segment, and the target speech segment comprises a spoken speech matching the target text segment: obtaining a target editing template in response to an editing template obtaining request: applying an editing operation indicated by the target editing template to the initial multimedia data to obtain target multimedia data; and generating a target video based on the target multimedia data.

In the second aspect, the present disclosure provides an apparatus for video generation comprising: an initial multimedia data generation module configured to generate initial multimedia data based on received text data, wherein the initial multimedia data comprises spoken speech of the text data and a video image matching the text data, the initial multimedia data comprising at least one multimedia segment, the at least one multimedia segment is respectively corresponding to at least one text segment divided from the text data, a target multimedia segment in the at least one multimedia segment is corresponding to a target text segment in the at least one text segment, the target multimedia segment comprises a target video segment and a target speech segment, the target video segment comprises a video image matching the target text segment, and the target speech segment comprises a spoken speech matching the target text segment: a target editing template obtaining module configured to obtain a target editing template in response to an editing template obtaining request: a target multimedia data generating module configured to apply an editing operation indicated by the target editing template to the initial multimedia data to obtain target multimedia data; and a target video generation module configured to generate a target video based on the target multimedia data.

In a third aspect, the present disclosure provides an electronic device comprising: one or more processors; and a storage for storing one or more programs, the one or more programs, when executed by the one or more processors, causing the one or more processors to implement the method of any of the first aspect.

In the fourth aspect, the present disclosure provides a computer-readable storage medium storing a computer program thereon, the program, when executed by a processor, implementing the method of any of the first aspects.

In a fifth aspect, the present disclosure provides a comprising computer programs or instructions that, when executed by a processor, implement the method of any of the first aspects.

The embodiments disclosed herein provide a method, apparatus, device, storage medium, and program product for video generation, comprising: generating initial multimedia data based on received text data: obtaining a target editing template in response to an editing template obtaining request: applying the editing operation indicated by the target editing template to initial multimedia data to obtain target multimedia data; and generating target video based on target multimedia data. According to the embodiments herein, a video is generated by directly applying the editing operation in the obtained editing template to multimedia data without the need for users to manually clip the video, which can not only reduce the time cost of video production, but also improve the quality of video production.

BRIEF DESCRIPTION OF THE DRAWINGS

In conjunction with the accompanying drawings and with reference to the following detailed description, the above and other features, advantages and aspects of the various embodiments of the present disclosure will become more apparent. Throughout the drawings, the same or similar reference numerals indicate the same or similar elements. It should be understood that the drawings are illustrative and that the originals and elements are not necessarily drawn to scale.

DETAILED DESCRIPTION

Figure 1:
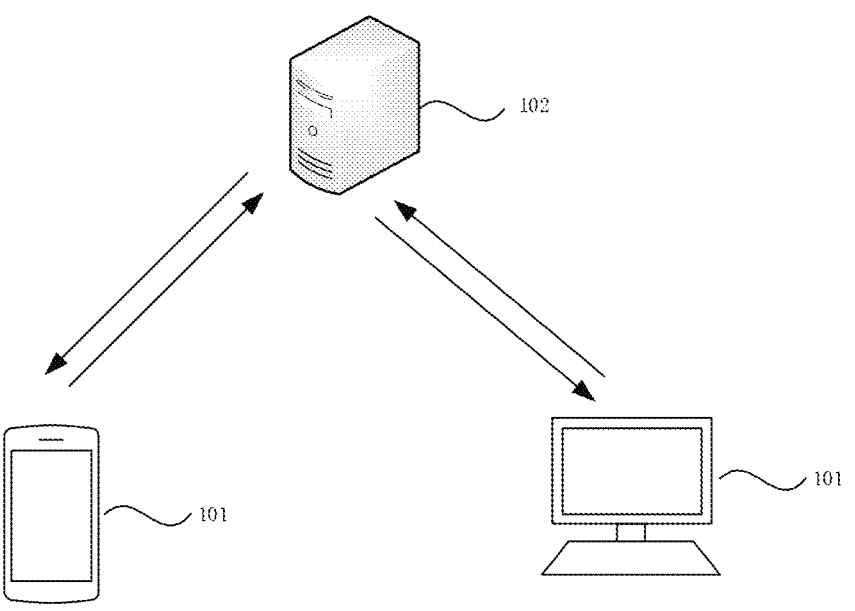
FIG. 1 shows an architecture diagram of a video production scene provided in an embodiment of the present disclosure.

The following will describe the embodiments of the present disclosure in more detail with reference to the accompanying drawings. Although some embodiments of the present disclosure are shown in the drawings, it should be understood that the present disclosure can be implemented in various forms and should not be construed as limited to the embodiments set forth herein. On the contrary, these embodiments are provided for a more thorough and complete understanding of the present disclosure. It should be understood that the drawings and embodiments of the present disclosure are for illustrative purposes only and are not intended to limit the scope of protection of the present disclosure.

It should be understood that the various steps described in the method implementation method of this disclosure can be executed in different orders and/or in parallel. In addition, the method implementation method can comprise additional steps and/or omit the steps shown. The scope of this disclosure is not limited in this regard.

The term "including" and its variations as used herein are open to comprise, i.e. "including but not limited to". The term "based on" means "at least partially based on". The term "one embodiment" means "at least one embodiment": the term "another embodiment" means "at least one additional embodiment"; and the term "some embodiments" means "at least some embodiments". Relevant definitions of other terms will be given in the following description.

It should be noted that the concepts of "first" and "second" mentioned in this disclosure are only used to distinguish different devices, modules, or units, and are not used to limit the order or interdependence of the functions performed by these devices, modules, or units.

It should be noted that the modifications of "one" and "a plurality of" mentioned in this disclosure are illustrative and not restrictive. Those skilled in the art should understand that unless otherwise specified in the context, they should be understood as "one or more".

The names of the messages or information exchanged between a plurality of devices in this public implementation are for illustrative purposes only and are not intended to limit the scope of these messages or information.

Before explaining the implementation examples of this application in detail, the application scenarios of the implementation examples of this application are first explained.

When users process documents, most of the documents are presented in text form, which is more laborious for the users to read. Therefore, the text information can be converted into video. In this way, users can listen to audio and watch video images to clarify the information conveyed by the article without the need to interpret the text, which can reduce the difficulty of obtaining information for users. Alternatively, due to the length of the text and the time-consuming time for users to read the text, they do not have the energy to read it one by one. Therefore, it is necessary to convert articles into videos, so that the users can quickly understand the information conveyed by the article through the video and choose the article they are interested in to read carefully. In addition, due to the diversity of the presentation form of videos, it is easier to attract users' attention than boring text reading, and users are more willing to read the article in this way.

In related technologies, it is necessary to extract keywords from text data: for each keyword, video images that match the keyword are searched in a predetermined image library; text information and video images are synthesized according to layout rules to obtain the target video. However, in related technologies, simply synthesizing the searched video images with text data results in poor video quality and requires users to manually edit. If users lack editing experience, it will affect the quality of the video.

According to embodiments of the present disclosure, after generating the initial multimedia data based on the text data, a target editing template is obtained, and the editing operation indicated by the target editing template is applied to the initial multimedia data, thereby realizing the editing processing of the initial multimedia data without the need for manual video editing by the user. This can not only reduce the time cost of video production, but also improve the quality of video production. FIG. 1 shows an architectural diagram of a video making scene provided in an embodiment of the present disclosure.

As shown in FIG. 1, the architecture diagram may comprise at least one electronic device 101 on the client side and at least one server 102 on the server side. The electronic device 101 can establish a connection and exchange information with the server 102 through network protocols such as HyperText Transfer Protocol Secure (HTTPS). The electronic device 101 can comprise devices with communication functions such as mobile phones, tablets, desktop computers, laptops, car end points, wearable devices, Smart home devices, as well as virtual machines or emulator-emulated devices. The server 102 can comprise devices with storage and computing functions such as Cloud as a Service or server clusters.

Based on the above architecture, users can create videos on designated platforms on electronic device 101, where the designated platforms can be designated applications or websites. After creating the video, users can send it to the server 102 of the designated platform. The server 102 can receive the video sent by electronic device 101 and store the received video to send it to the electronic device that needs to play the video.

In the embodiments of the present disclosure, in order to reduce the time cost of video production and improve the quality of the produced video, the electronic device 101 can receive from a user an editing template obtaining request for initial multimedia data. Upon receiving the editing template obtaining request, the electronic device 101 can obtain the target editing template, apply the editing operation indicated by the target editing template to the initial multimedia data, obtain the target multimedia data, and generate the target video based on the target multimedia data. It can be seen that in the process of generating the target video, the editing operation in the obtained target editing template is directly applied to the initial multimedia data without the need for the user to manually edit the video. This can not only reduce the time cost of video production, but also improve the quality of the produced video.

Optionally, based on the above architecture, the electronic device 101 can also obtain the target editing template upon receiving the editing template obtaining request, apply the editing operation indicated by the target editing template to the initial multimedia data, obtain the target multimedia data, and generate the target video based on the target multimedia data, so as to apply the editing operation indicated by the target editing template to the initial multimedia data locally on the electronic device 101, thereby generating the target video to further reduce the time cost of video production.

Optionally, based on the above architecture, the electronic device 101 can also send an editing template obtaining request carrying the template identifier to the server 102 after receiving the editing template obtaining request sent by the electronic device 101. After receiving the editing template obtaining request carrying the template identifier sent by the electronic device 101, the server 102, in response to the editing template obtaining request, can obtain the target editing template, apply the editing operation indicated by the target editing template to the initial multimedia data, obtain the target multimedia data, generate the target video based on the target multimedia data, and send the generated target video to the electronic device 101. In this way, the electronic device 101 can request the server 102 to obtain the target editing template based on the editing template obtaining request and apply the editing operation indicated by the target editing template to the initial multimedia data to generate the target video, so as to further improve the quality of the produced video and reduce the data processing amount of the electronic device 101.

For example, the electronic device can be a mobile end point, a fixed end point or a portable end point, such as a mobile phone, a site, a unit, a device, a multimedia computer, a multimedia tablet, an Internet node, a communicator, a desktop computer, a laptop computer, a notebook computer, a netbook computer, a tablet computer, a personal communication system (PCS) device, a personal navigation device, a personal digital assistant (PDA), an audio/video player, a digital camera/camcorder, a positioning device, a television receiver, a radio broadcast receiver, an e-book device, a gaming device, or any combination thereof, including accessories and peripherals of these devices, or any combination thereof.

The server can be a physical server or a Cloud as a Service, a server can be a server, or a server cluster.

The method of video generation proposed in the embodiment of the present application will be described in detail below in conjunction with the accompanying drawings.

Figure 2:
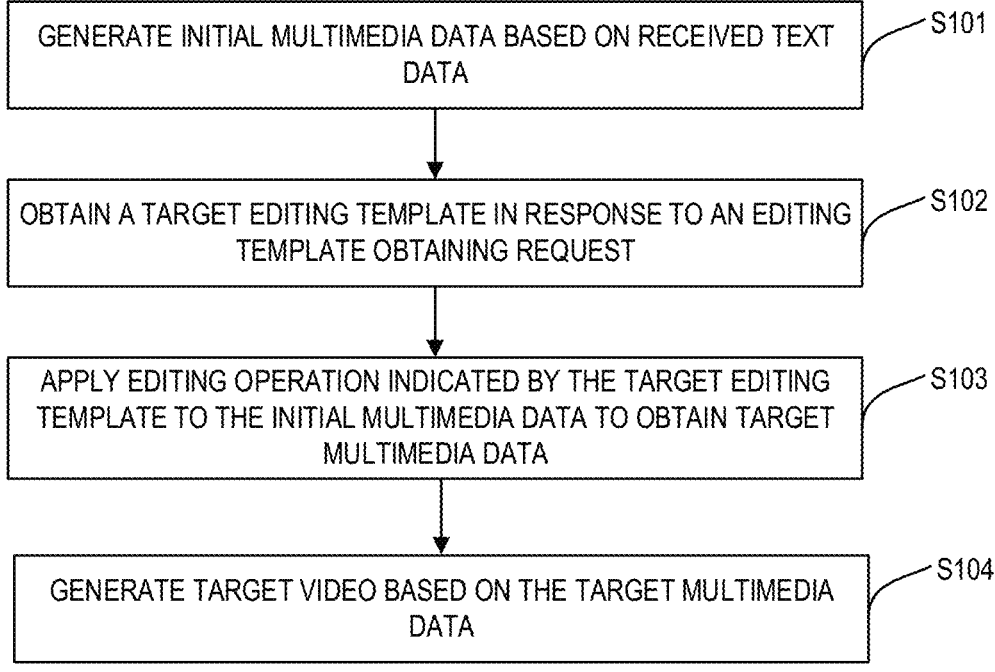
FIG. 2 is a schematic diagram of a method of video generation in an embodiment of the present disclosure.

FIG. 2 is a flowchart of a method of generating a video embodiment of the present disclosure, the present embodiment is applicable to the case of generating a video based on the text information. The method can be performed by an apparatus for video generation which can be implemented in software and/or hardware. This method of video generation can be implemented in the electronic device as shown in FIG. 1.

As shown in FIG. 2, the method of video generation provided in embodiments of the present disclosure mainly comprises steps S101-S104.

S101, generate initial multimedia data based on the received text data.

In one embodiment of the present disclosure, the text data can be data entered by the user into the electronic device through an input device, or data sent by other devices to the electronic device.

In one embodiment of the present disclosure, before generating initial multimedia data based on the received text data, the method further comprises: receiving text data in response to the user's input data operation. The user's input data operation may comprise adding operations of the text data or entering operations of text data. Embodiments are not limited in this regard.

In one embodiment of the present disclosure, the initial multimedia data comprises a spoken speech of the text data and a video image matching the text data. The initial multimedia data comprises at least one multimedia segment, each segment corresponding to at least one text segment divided from the text data. The target multimedia segment in the at least one multimedia segment corresponds to the target text segment in the at least one text segment. The target multimedia segment comprise a target video segment and a target speech segment, where the target video segment comprise a video image matching the target text segment, and the target speech segment comprises a spoken speech that matches the target text segment.

In one embodiment of the present disclosure, generating the initial multimedia data based on the received text data comprises dividing the received text data into at least one text segment, and the text segment comprises a plurality of target text segments. For each target text segment, a video image corresponding to the target text segment is searched in a predetermined library based on the target text segment, and the video image is processed according to the predetermined animation effect to obtain the target video segment corresponding to the target text segment. The spoken speech matching the target text segment is obtained, and the target speech segment is generated. The target video segment and the target speech segment are synthesized to obtain the target multimedia segment. For each target text segment, a plurality of target multimedia segments are obtained, and the a plurality of target multimedia segments are synthesized in the sequential order of the target text segments to obtain initial multimedia data.

In one embodiment of the present disclosure, the video image comprise subtitle text that matches the target text segment.

In embodiments of the present disclosure, subtitle text matching the target text segment is added to the video image to facilitate users to visually see the subtitles corresponding to the spoken speech while watching the video, thereby improving the user's viewing experience.

S102, in response to an editing template obtaining request, obtain the target editing template.

In one embodiment of the present disclosure, the response to the editing template obtaining request may be a response to the editing template obtaining request after receiving the user's operation on the electronic device. It can also be a response to the editing template obtaining request after detecting the initial multimedia data generation.

The target editing template can be selected based on the user's operation of the electronic device, or automatically matched to the editing template based on keywords in the text data.

In one embodiment of the present disclosure, obtaining the target editing template comprises directly obtaining the target clip module by the electronic device in a locally pre-stored template database.

In one embodiment of the present disclosure, obtaining a target editing template comprises obtaining a template identifier corresponding to the target editing template and sending an editing template obtaining request carrying the template identifier to a server by the electronic device. The server responds to the editing template obtaining request carrying the template identifier, obtains the target editing template based on the template identifier, and returns the obtained target editing template to the electronic device.

In one embodiment of the present disclosure, if the target editing template cannot be obtained, a prompt pop-up box is displayed on the display interface of the electronic device, which is used to prompt the failure to obtain the target editing template.

In one embodiment of the present disclosure, obtaining the target editing template in response to an editing template obtaining request comprises: in response to a triggering operation on the template theme control, determining the editing template corresponding to the triggering operation as the target editing template; and obtaining the target editing template.

In one embodiment of the present disclosure, at least one template theme control is displayed on the interactive interface of the electronic device, and in response to the user's triggering operation of the template theme control, the editing template corresponding to the triggering operation is determined as the target editing template.

Figure 3:
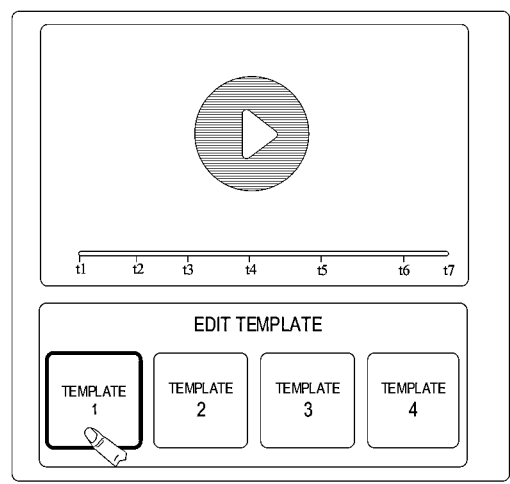
FIG. 3 is a schematic diagram of the triggering of the template theme control in the disclosed embodiment.

As shown in FIG. 3, in response to the user's triggering operation of the template theme 1 control, the editing template corresponding to the template theme 1 control is determined as the target editing template.

In embodiments of the present disclosure, the target editing template is selected by the user's triggering operation, which is convenient for the user to select the editing template that satisfies them and improves the user experience.

In one embodiment of the present disclosure, before responding to the triggering operation of the editing template control, a video editing area is displayed, wherein the video editing area comprising a template control. In response to the triggering operation of the template control, a mask area is displayed and at least one template theme control is displayed on the mask area.

Figure 4:
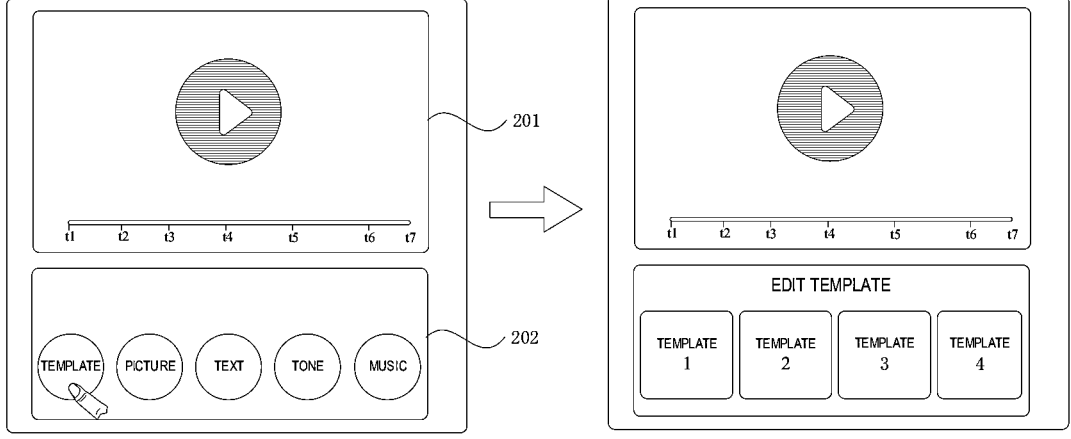
FIG. 4 is a schematic diagram of the triggering of the template control in the disclosed embodiment.

In an embodiment of the present disclosure, as shown in FIG. 4, after generating the initial multimedia data, the video preview area 10 and the video editing area 20 are displayed in the display interface of the electronic device, and a plurality of editing controls are comprised in the video editing area 20, such as template control, picture control, text control, tone control, and music control. The template control is used to indicate that the user can edit the initial multimedia data using existing templates. The picture control is used to indicate that the user edits the video image in the initial multimedia data. The text control is used to indicate that the user edits the subtitle text in the initial multimedia data. The tone control is used to indicate that the user edits the spoken speech in the initial multimedia data. The music control is used to indicate that the user edits the background music in the initial multimedia data.

In one embodiment of the present disclosure, as shown in FIG. 4, in response to a user's triggering operation on the template control, a mask area is displayed and a plurality of editing template theme controls are displayed in the mask area. In response to the left-right sliding operation on the mask area, a plurality of editing template theme controls are displayed with the effect of left and right sliding.

In embodiments of the present disclosure, a plurality of template theme controls are displayed in response to the user's triggering operation on the template control, making the operation simple and easy to understand and convenient for users to operate.

S103, apply the editing operation indicated by the target editing template to the initial multimedia data to obtain the target multimedia data.

In one embodiment of the present disclosure, the target editing template comprises at least one editing operation, which is applied to the initial multimedia data and can perform an editing operation on the initial multimedia data.

Figure 5:
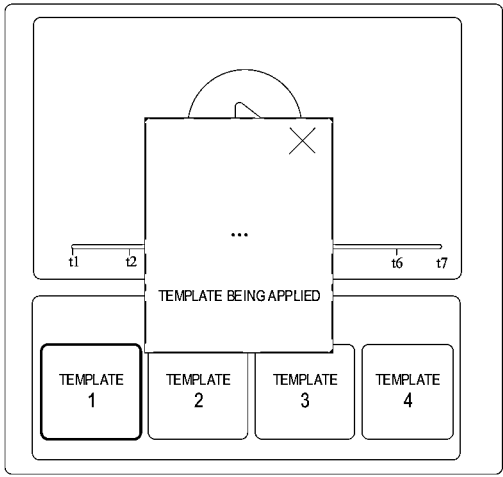
FIG. 5 is a schematic diagram of the template application prompt in the disclosed embodiment.

In one embodiment of the present disclosure, as shown in FIG. 5, in applying the editing operation indicated by the target editing template to the initial multimedia data, since the editing of the initial multimedia data takes a certain amount of time, an application prompt box is displayed on the display interface of the electronic device, which is used to prompt the user to use the editing operation indicated in the editing template to edit the initial multimedia video.

In one embodiment of the present disclosure, if the editing operation indicated by the target editing template is successfully applied to the initial multimedia data, a prompt message indicating that the editing template application is successful is displayed. If the editing operation indicated by the target editing template is not successfully applied to the initial multimedia data, a prompt message indicating that the editing template application has failed is displayed, and the user is prompted to re-select the editing template.

In one embodiment of the present disclosure, the editing operation indicated by the target editing template comprises a video synthesis operation. In such embodiment, applying the editing operation indicated by the target editing template to the initial multimedia data to obtain the target multimedia data comprises: synthesizing the video segments in the target editing template with the multimedia segments comprised in the initial multimedia data based on the video synthesis operation to obtain the target multimedia data.

In the embodiment of the present disclosure, the target editing template comprises one or more video segments. The editing operation indicated by the target editing template comprises: in the case of video synthesis operation, synthesizing one or more video segments in the target editing template with multimedia segments in the initial multimedia data to obtain target multimedia data.

In the implementation example of this disclosure, the video segment(s) in the target editing template is added between any two video frames of the multimedia segments. The above video segment synthesis operation can be any existing video synthesis approaches and the embodiments herein are not limited in this regard.

In an embodiment of the present disclosure, the video synthesis operation in the editing template is used to achieve the synthesis of a plurality of videos, thereby avoiding manual video synthesis by users, reducing the time cost of video production, and improving the quality of video production.

In one embodiment of the present disclosure, obtaining the target multimedia data by synthesizing the video segments in the target editing template with the multimedia segments in the initial multimedia data based on the video synthesis operation comprises: loading the video segment(s) in the target editing template to the predetermined position of the multimedia segments in the initial multimedia data based on the video synthesis operation, wherein the predetermined position comprises a position before the first frame of the initial multimedia data and/or a position after the last frame of the initial multimedia data.

In embodiments of the present disclosure, the target editing template comprises a plurality of video segments and addition positions for the respective video segments.

In one embodiment of the present disclosure, if the addition position corresponding to the video segment in the target editing template is the header position, the video segment is added to the initial multimedia data before the first frame of media data as the target video header.

In one embodiment of the present disclosure, if the addition position corresponding to the video segment comprised in the target editing template is the end position, the video segment is added to the initial multimedia data after the last frame of media data as the opening of the target video.

In one embodiment of the present disclosure, if the text data comprises a text theme, the text theme is added to the position of the text theme in the video segment corresponding to the title, and the text theme is edited and rendered on the screen according to the text theme display effect in the target editing template. Furthermore, if the text data comprises a text author, the text author is added to the position of the text author in the video segment corresponding to the title, and the text author information is edited and rendered on the screen according to the text author display effect in the target editing template.

In one embodiment of the present disclosure, if the acquired information of the video maker, the video maker information is added to the position of the creator corresponding to the end of the video segment, and the video maker according to the target editing template comprised in the display effect of the video maker information is edited and rendered on the screen.

In embodiments of the present disclosure, the operation of adding a title and/or ending credits is realized by the video synthesis operation in the editing template, thereby avoiding the user from manually adding a title or ending credits, reducing the time cost of making videos, and improving the quality of the produced videos.

In one embodiment of the present disclosure, the editing operation indicated by the target editing template comprises a transition setting operation. In such embodiment, applying the editing operation indicated by the target editing template to the initial multimedia data to obtain the target multimedia data comprises: adding a transition to the multimedia segment in the initial multimedia data based on the transition setting operation to obtain the target multimedia data.

In one embodiment of the present disclosure, the initial multimedia data comprises a plurality of video images that match the text data, and the plurality of video images are inevitably involved in image transition settings during switching. In the related art, the user needs to manually set the transition between two adjacent video images, increasing the time cost of video making.

In one embodiment of the present disclosure, the transition comprises one or more of the following: shutter animation effect, cut animation effect, flicker animation effect, gradual change animation effect, cross animation effect, zoom animation effect and the like.

In one embodiment of the present disclosure, the editing operation indicated by the target editing template comprises a transition setting operation, and the transition setting operation comprises a plurality of transition types. The plurality of transition types in the transition setting operation are applied to the multimedia segment based on their types, so that each multimedia segment has a respective transition.

In one embodiment of the present disclosure, if the transition setting operation comprises a single transition type, this transition type is applied to the multimedia segment such that the multimedia segment has the same transition.

In embodiments of the present disclosure, the transition setting operation in the editing template is used to add transitions to multimedia segments, thereby avoiding users from manually setting transitions, reducing the time cost of video production, and improving the quality of video production.

In one embodiment of the present disclosure, the editing operation indicated by the target editing template comprises a virtual object addition operation. In such embodiment, applying the editing operation indicated by the target editing template to the initial multimedia data to obtain the target multimedia data comprises: adding the virtual object in the target editing template to a predetermined position of the initial multimedia data based on the virtual object addition operation to obtain the target multimedia data.

In one embodiment of the present disclosure, the virtual objects may include target video segments, virtual stickers, virtual objects, virtual cards, and other objects. Optionally, the virtual objects may comprise facial decorative features, headgear features, clothing features, and clothing accessory features, etc.

In one embodiment of the present disclosure, the virtual object saved in the target editing template can be directly added to the predetermined position of the initial multimedia data. Optionally, the specific parameters of the predetermined position can be saved in the target editing template. It is possible to set in the target editing template that a sticker of the flash effect is to be added to the third image of video.

In one embodiment of the present disclosure, the addition position of the virtual object can be determined based on the keywords proposed in the text information. Optionally, the virtual object is added to the video image corresponding to the keyword.

In embodiments of the present disclosure, virtual objects are added to multimedia segments by adding virtual objects in the editing template, thereby avoiding users from manually adding virtual objects, reducing the time cost of video production, and improving the quality of video production.

In one embodiment of the present disclosure, the editing operation indicated by the target editing template comprises a background audio addition operation. In such embodiment, applying the editing operation indicated by the target editing template to the initial multimedia data to obtain the target multimedia data comprises: mixing the background audio included in the target editing template with the spoken speech included in the initial multimedia data based on the background audio addition operation to obtain the target multimedia data.

In one embodiment of the present disclosure, the target editing template includes a background audio. Based on the back audio addition operation, the background audio and the reading voice are mixed based on the timestamp corresponding to the background audio and the reading voice to obtain the target multimedia data.

In one embodiment of the present disclosure, the playback parameters of the background audio are adjusted based on the playback parameters of the spoken speech, so that these two can be more integrated.

In embodiments of the present disclosure, the background audio is added to multimedia segments by adding background audio in the editing template, thereby avoiding users from manually adding background music, reducing the time cost of video production, and improving the quality of video production.

In one embodiment of the present disclosure, the editing operation indicated by the target editing template comprises a keyword extraction operation. In such embodiment, applying the editing operation indicated by the target editing template to the initial multimedia data comprises: extracting a keyword(s) in the target text segment for at least one target text segment; and adding the keyword(s) to the target multimedia segment corresponding to the target text segment.

In one embodiment of the present disclosure, keywords can be dates, numbers, character names, proprietary names, place names, plants, animals, etc.

In one embodiment of the present disclosure, the target text segment is "Zhang San paid cash 200,000 Yuan to Li Si on the same day", the target text segment extracted keyword is "200,000 Yuan", the keyword "200,000 Yuan" is added to the target text segment corresponding to the target multimedia segment.

In one embodiment of the present disclosure, the target editing module further comprises keyword parameters comprising the color, font, addition effect, etc. of the keywords. The display information of the keyword in the target multimedia segment is set according to the keyword parameters.

In the disclosed embodiment, keywords are added to multimedia segments through keyword extraction operations in the editing template, so that users can more clearly understand the key information of the text clips.

In one embodiment of the present disclosure, adding the keyword to the target multimedia segment corresponding to the target text segment comprises: obtaining key text information matching the keyword; and adding the keyword and the key text information to the target multimedia segment corresponding to the target text segment.

In the embodiments of this disclosure, after extracting keywords from the target text segment, the key information matching the keywords is obtained based on the above keywords. For example, the keyword is "Wang Wu", and the key information matching the keyword is: Wang Wu is an actor, and his representative works are "TV Drama A" and "Movie B". In this example, "Wang Wu" is used as the keyword, "actor", and "representative works" TV Drama A "and" Movie B "are used as key text information to add to the target multimedia segment. As another example, the keyword may be "crime of duty encroachment", and the matched keyword information is "crime of duty encroachment refers to the behavior of personnel of a company; enterprise or other unit who illegally occupy the property of their unit with a large amount of money by taking advantage of their position." In this example, "crime of duty encroachment" is used as the keyword, and "crime of duty encroachment refers to the behavior of personnel of a company, enterprise or other unit who illegally occupy the property of their unit with a large amount of money by taking advantage of their position" is added into the target multimedia segment as the key text information.

In one embodiment of the present disclosure, different display parameters can be set for keywords and keyword text information.

In one embodiment of the present disclosure, the above-mentioned key text information that matches the keyword can be text information extracted from text data, or text information obtained from the Internet or a predetermined knowledge base. Scope of the embodiments is not limited to the ways for obtaining key text information.

In embodiments of the present disclosure, the key text information is extracted by keywords, and keywords and key text information are added to the video, so that users can quickly understand knowledge related to keywords and assist users in understanding the content of text data.

S104, generate a target video based on target multimedia data.

The present disclosure provides a method, apparatus, device, storage medium, and program product for video generation, the method comprising: generating initial multimedia data based on received text data: wherein the initial multimedia data comprises a video image in which the spoken speech of the text data matches the text data, the initial multimedia data comprises at least one multimedia segment, and the at least one multimedia segment corresponds to at least one text segment divided by the text data: the target multimedia segment in the at least one multimedia segment corresponds to the target text segment in the at least one text segment, and the target multimedia segment comprises a target video segment and a target speech segment: the target video segment comprises a video image matching the target text segment, and the target voice segment comprises a spoken speech matching the target text segment: in response to an editing template obtaining request, obtaining the target editing template: applying the editing operation indicated by the target editing template to the initial multimedia data to obtain the target multimedia data; and generating the target video based on the target multimedia data. Embodiments of the present disclosure generate a video by directly applying the editing operation in the obtained editing template to the multimedia data, without the need for the user to manually clip the video, which can not only reduce the time cost of video production, but also improve the quality of video production.

Figures 6, 7:
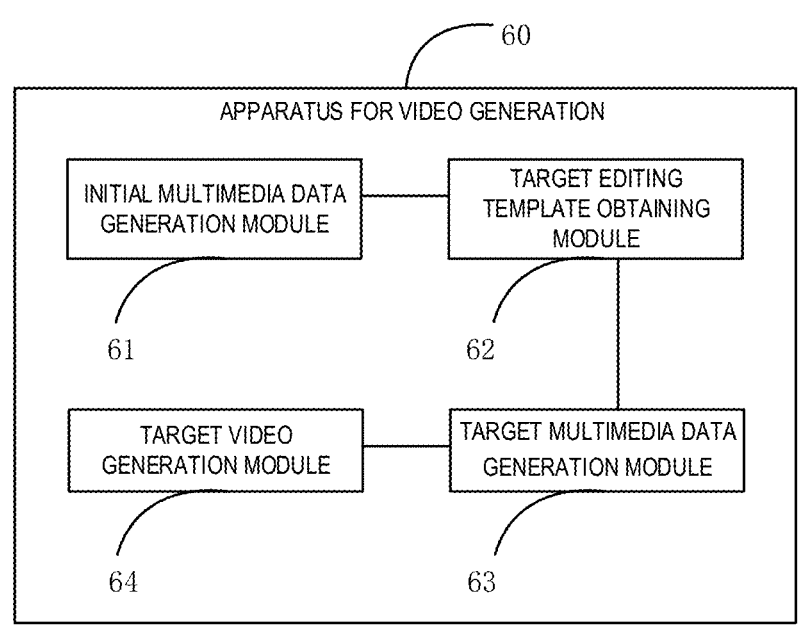
FIG. 6 is a schematic diagram of the structure of an apparatus for video generation in an embodiment of the present disclosure.
FIG. 7 is a schematic diagram of an electronic device in an embodiment of the present disclosure.

FIG. 6 is a flowchart of a method of generating a video according to an embodiment of the present disclosure. This embodiment is applicable to the case of generating a video based on the text information, and the method may be performed by an apparatus for video generation which can be implemented by software and/or hardware. Such an apparatus can be configured in an electronic device.

As shown in FIG. 6, the apparatus for video generation 60 as provided by embodiments herein mainly comprises: an initial multimedia data generation module 61, a target editing template obtaining module 62, a target multimedia data generation module 63, and a target video generation module 64.

The initial multimedia data generation module 61 is configured to generate initial multimedia data based on received text data, wherein the initial multimedia data comprises spoken speech of the text data and a video image matching the text data, the initial multimedia data comprising at least one multimedia segment, the at least one multimedia segment is respectively corresponding to at least one text segment divided from the text data, a target multimedia segment in the at least one multimedia segment is corresponding to a target text segment in the at least one text segment, the target multimedia segment comprises a target video segment and a target speech segment, the target video segment comprises a video image matching the target text segment, and the target speech segment comprises a spoken speech matching the target text segment: the target editing template obtaining module 62 is configured to obtain a target editing template in response to an editing template obtaining request: the target multimedia data generation module 63 is configured to apply an editing operation indicated by the target editing template to the initial multimedia data to obtain target multimedia data; and the target video generation module 64 is configured to generate the target video based on the target multimedia data.

In one embodiment of the present disclosure, the video image comprises subtitle text that matches the target text segment.

In one embodiment of the present disclosure, the target editing template obtaining module 62, in order to obtain the target editing template in response to the editing template obtaining request, comprises: a target editing template determination unit configured to in response to a triggering operation for a template theme control, determine an editing template corresponding to the triggering operation as the target editing template; and a target editing template obtaining unit configured to obtain the target editing template.

In one embodiment of the present disclosure, the target editing template obtaining module 62 further comprises: a video editing area display unit configured to, before in response to the triggering operation of the editing template control, display a video editing area comprising a template control: a mask area display unit configured to display a mask area in response to a triggering operation of the template control and to display at least one template theme control on the mask area.

In one embodiment of the present disclosure, the editing operation indicated by the target editing template comprises a video synthesis operation; and the target multimedia data generation module 63 is specifically configured to synthesize a video segment in the target editing template with the multimedia segments in the initial multimedia data based on the video synthesis operation to obtain the target multimedia data.

In one embodiment of the present disclosure, the target multimedia data generation module 63 is specifically configured to load the video segment in the target editing template to a predetermined position of the multimedia segments in the initial multimedia data based on the video synthesis operation to obtain the target multimedia data, wherein the predetermined position comprises a position before the first frame of media data of the initial multimedia data and/or a position after the last frame of media data of the initial multimedia data.

In one embodiment of the present disclosure, the editing operation indicated by the target editing template comprises a transition setting operation; and the target multimedia data generation module 63 is specifically configured to add a transition effect to the multimedia segment in the initial multimedia data based on the transition setting operation to obtain the target multimedia data.

In one embodiment of the present disclosure, the editing operation indicated by the target editing template comprises a virtual object addition operation; and the target multimedia data generation module 63 is specifically configured to add a virtual object in the target editing template to a predetermined position of the initial multimedia data based on the virtual object addition operation to obtain the target multimedia data.

In one embodiment of the present disclosure, the editing operation indicated by the target editing template comprises a background audio addition operation; and the target multimedia data generation module 63 is specifically configured to mix a background audio in the target editing template with the spoken speech in the initial multimedia data based on the background audio addition operation to obtain target multimedia data.

In one embodiment of the present disclosure, the editing operation indicated by the target editing template comprises a keyword extraction operation; and the target multimedia data generation module 63 is specifically configured to extract a keyword from the at least one target text segment and to add the keyword to the target multimedia segment corresponding to the target text segment.

In one embodiment of the present disclosure, the target multimedia data generation module 63 is specifically used to obtain key text information matching the keyword and to add the keyword and the key text information to the target multimedia segment corresponding to the target text segment.

The apparatus for video generation as provided in the disclosed embodiment can perform the steps of the method of video generation as described in the embodiments herein, and the specific execution of the steps and the beneficial effects will not be repeated here.

FIG. 7 is a schematic diagram of the structure of an electronic device in an embodiment of the present disclosure. FIG. 7 shows a schematic diagram of the structure suitable for implementing the electronic device 700 in the embodiment of the present disclosure. The electronic device 700 in the embodiment of the present disclosure may comprise but is not limited to mobile end points such as mobile phones, laptops, digital broadcast receivers, PDAs (personal digital assistants), PAD (tablet computers), PMPs (portable multimedia players), car-mounted end points (such as car navigation end points), wearable end points, and fixed end points such as digital TVs, desktop computers, and smart home devices. The electronic device shown in FIG. 7 is only an example and should not bring any limitations on the functionality and scope of use of the embodiment of the present disclosure.

As shown in FIG. 7, the electronic device 700 may comprise a processing device (such as a Central Processor, graphics processing unit, etc.) 701, which can perform various appropriate actions and processes based on programs stored in a read-only memory (ROM) 702 or loaded from a storage device 708 into a random access memory (RAM) 703 to implement the image rendering method of the embodiments described in this disclosure. In RAM 703, various programs and data required for the operation of the terminal device 700 are also stored. The processing device 701, ROM 702, and RAM 703 are connected to each other through a bus 704. The input/output (I/O) interface 705 is also connected to the bus 704.

Typically, the following devices can be connected to the I/O interface 705: input device 706, including touch screens, touchpads, keyboards, mice, cameras, microphones, accelerometers, gyroscopes, etc.: output device 707, including liquid crystal displays (LCDs), speakers, vibrators, etc.: storage device 708, including magnetic tapes, hard disks, etc.; and communication device 709. Communication device 709 can allow terminal device 700 to communicate wirelessly or wirelessly with other devices to exchange data. Although FIG. 7 shows terminal device 700 with various devices, it should be understood that it is not required to implement or have all of the devices shown. More or fewer devices can be implemented or provided instead.

Specifically, according to the embodiments of the present disclosure, the process described above with reference to the flowchart can be implemented as a computer software program. For example, the embodiments of the present disclosure comprise a computer program product that comprises a computer program carried on a non-transitory computer-readable medium, the computer program containing program code for executing the method shown in the flowchart, thereby implementing the method of video generation as described above. In such embodiments, the computer program can be downloaded and installed from the network through the communication device 709, or installed from the storage device 708, or installed from the ROM 702. When the computer program is executed by the processing device 701, the above-mentioned functions defined in the methods of the embodiments of the present disclosure are performed.

It should be noted that the computer-readable medium described above in this disclosure can be a computer-readable signal medium or a computer-readable storage medium or any combination thereof. The computer-readable storage medium can be, for example, but not limited to, an electrical, magnetic, optical, electromagnetic, infrared, or semiconductor system, device, or any combination thereof. More specific examples of computer-readable storage media can include, but are not limited to, an electrical connection with one or more wires, a portable computer disk, a hard disk, random access memory (RAM), read-only memory (ROM), erasable programmable read-only memory (EPROM or flash memory), optical fibers, portable compact disk read-only memory (CD-ROM), optical storage devices, magnetic storage devices, or any suitable combination thereof. In this disclosure, a computer-readable storage medium can be any tangible medium containing or storing a program that can be used by or in conjunction with an instruction execution system, device, or device. In this disclosure, a computer-readable signal medium can comprise a data signal propagated in a baseband or as part of a carrier wave, which carries computer-readable program code. Such propagated data signals can take many forms, including but not limited to electromagnetic signals, optical signals, or any suitable combination thereof. Computer-readable signal media can also be any computer-readable medium other than computer-readable storage media, which can send, propagate, or transmit programs for use by or in conjunction with instruction execution systems, devices, or devices. The program code contained on the computer-readable medium can be transmitted using any suitable medium, including but not limited to: wires, optical cables, RF (radio frequency), etc., or any suitable combination thereof.

In some embodiments, the client and server may communicate using any currently known or future developed network protocol such as HTTP (Hypertext Transfer Protocol) and may be interconnected with any form or medium of digital data communication (e.g., a communication network). Examples of communication networks comprise local area networks ("LANs"), wide area networks ("WANs"), the Internet (e.g., the Internet), and end-to-end networks (e.g., ad hoc end-to-end networks), as well as any currently known or future developed networks.

The computer-readable medium can be comprised in the electronic device, or it can exist alone without being assembled into the electronic device.

The computer-readable medium carries one or more programs that, when executed by the terminal device, cause the terminal device to: generate initial multimedia data based on received text data, wherein the initial multimedia data comprises spoken speech of the text data and a video image matching the text data, the initial multimedia data comprising at least one multimedia segment, the at least one multimedia segment is respectively corresponding to at least one text segment divided from the text data, a target multimedia segment in the at least one multimedia segment is corresponding to a target text segment in the at least one text segment, the target multimedia segment comprises a target video segment and a target speech segment, the target video segment comprises a video image matching the target text segment, and the target speech segment comprises a spoken speech matching the target text segment; obtain a target editing template in response to an editing template obtaining request: apply an editing operation indicated by the target editing template to the initial multimedia data to obtain target multimedia data; and generate a target video based on the target multimedia data.

Alternatively, when the one or more programs are executed by the terminal device, the terminal device may also perform other steps described in the above embodiments.

Computer program code for performing the operations of the present disclosure may be written in one or more programming languages, or combinations thereof, including but not limited to Object Oriented programming languages such as Java, Smalltalk, C++, and also including conventional procedural programming languages such as "C" language or similar programming languages. The program code may be executed entirely on the user's computer, partially on the user's computer, as a standalone software package, partially on the user's computer, or entirely on a remote computer or server. In the case of a remote computer, the remote computer may be connected to the user's computer through any type of network, including a local area network (LAN) or a wide area network (WAN), or may be connected to an external computer (e.g., using an Internet service provider to connect via the Internet).

The flowcharts and block diagrams in the accompanying drawings illustrate the architecture, functions, and operations of the system, method, and computer program product that may be implemented in accordance with various embodiments of the present disclosure. In this regard, each block in the flowcharts or block diagrams may represent a module, program segment, or portion of code that contains one or more executable instructions for implementing a specified logical function. It should also be noted that in some alternative implementations, the functions marked in the blocks may also occur in a different order than those marked in the drawings. For example, two consecutive blocks may actually be executed substantially in parallel, and they may sometimes be executed in the opposite order, depending on the function involved. It should also be noted that each block in the block diagrams and/or flowcharts, as well as combinations of blocks in the block diagrams and/or flowcharts, may be implemented using a dedicated hardware-based system that performs the specified function or operation, or may be implemented using a combination of dedicated hardware and computer instructions.

The units described in the disclosed embodiments can be implemented by software or by hardware. The name of the unit does not limit the unit itself in some cases.

The functions described above herein may be performed at least in part by one or more hardware logic components. For example, without limitation, exemplary types of hardware logic components that can be used comprise: field programmable gate arrays (FPGAs), application specific integrated circuits (ASICs), application specific standard products (ASSPs), system-on-chip (SOCs), complex programmable logic devices (CPLDs), and the like.

In the context of this disclosure, machine-readable media can be tangible media that can contain or store programs for use by or in conjunction with instruction execution systems, devices, or devices. Machine-readable media can be machine-readable signal media or machine-readable storage media. Machine-readable media can comprise, but are not limited to, electronic, magnetic, optical, electromagnetic, infrared, or semiconductor systems, devices, or devices, or any suitable combination thereof. More specific examples of machine-readable storage media may comprise electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination thereof.

According to one or more embodiments of the present disclosure, the present disclosure provides a method of video generation, comprising: generating initial multimedia data based on received text data, wherein the initial multimedia data comprises spoken speech of the text data and a video image matching the text data, the initial multimedia data comprising at least one multimedia segment, the at least one multimedia segment is respectively corresponding to at least one text segment divided from the text data, a target multimedia segment in the at least one multimedia segment is corresponding to a target text segment in the at least one text segment, the target multimedia segment comprises a target video segment and a target speech segment, the target video segment comprises a video image matching the target text segment, and the target speech segment comprises a spoken speech matching the target text segment: obtaining a target editing template in response to an editing template obtaining request: applying an editing operation indicated by the target editing template to the initial multimedia data to obtain target multimedia data; and generating a target video based on the target multimedia data.

According to one or more embodiments of the present disclosure, the present disclosure provides a method of video generation, wherein the video image comprises subtitle text that matches the target text segment.

According to one or more embodiments of the present disclosure, the present disclosure provides a method of video generation, wherein obtaining a target editing template in response to an editing template obtaining request comprises: in response to a triggering operation for a template theme control, determining an editing template corresponding to the triggering operation as the target editing template; and obtaining the target editing template.

According to one or more embodiments of the present disclosure, the present disclosure provides a method of video generation, further comprising: displaying a video editing area comprising a template control: displaying a mask area in response to a triggering operation of the template control; and displaying at least one template theme control on the mask area.

According to one or more embodiments of the present disclosure, the present disclosure provides a method of video generation, the editing operation indicated by the target editing template comprises a video synthesis operation; and wherein applying an editing operation indicated by the target editing template to the initial multimedia data to obtain target multimedia data comprises: synthesizing a video segment in the target editing template with the multimedia segments in the initial multimedia data based on the video synthesis operation to obtain the target multimedia data.

According to one or more embodiments of the present disclosure, the present disclosure provides a method of video generation, wherein synthesizing a video segment in the target editing template with the multimedia segments in the initial multimedia data based on the video synthesis operation to obtain the target multimedia data comprises: loading the video segment in the target editing template to a predetermined position of the multimedia segments in the initial multimedia data based on the video synthesis operation to obtain the target multimedia data, wherein the predetermined position comprises a position before the first frame of media data of the initial multimedia data and/or a position after the last frame of media data of the initial multimedia data.

According to one or more embodiments of the present disclosure, the present disclosure provides a method of video generation, wherein the editing operation indicated by the target editing template comprises a transition setting operation; and wherein applying an editing operation indicated by the target editing template to the initial multimedia data to obtain target multimedia data comprises: adding a transition effect to the multimedia segment in the initial multimedia data based on the transition setting operation to obtain the target multimedia data.

According to one or more embodiments of the present disclosure, the present disclosure provides a method of video generation, wherein the editing operation indicated by the target editing template comprises a virtual object addition operation; and wherein applying an editing operation indicated by the target editing template to the initial multimedia data to obtain target multimedia data comprises: adding a virtual object in the target editing template to a predetermined position of the initial multimedia data based on the virtual object addition operation to obtain the target multimedia data.

According to one or more embodiments of the present disclosure, the present disclosure provides a method of video generation, wherein the editing operation indicated by the target editing template comprises a background audio addition operation; and wherein applying an editing operation indicated by the target editing template to the initial multimedia data to obtain target multimedia data comprises: mixing a background audio in the target editing template with the spoken speech in the initial multimedia data based on the background audio addition operation to obtain target multimedia data.

According to one or more embodiments of the present disclosure, the present disclosure provides a method of video generation, wherein the editing operation indicated by the target editing template comprises a keyword extraction operation; and wherein applying an editing operation indicated by the target editing template to the initial multimedia data to obtain target multimedia data comprises: extracting a keyword from the at least one target text segment; and adding the keyword to the target multimedia segment corresponding to the target text segment.

According to one or more embodiments of the present disclosure, the present disclosure provides a method of video generation, wherein adding the keyword to the target multimedia segment corresponding to the target text segment comprises: obtaining key text information matching the keyword; and adding the keyword and the key text information to the target multimedia segment corresponding to the target text segment.

According to one or more embodiments of the present disclosure, the present disclosure provides an apparatus for video generation comprising: an initial multimedia data generation module configured to generate initial multimedia data based on received text data, wherein the initial multimedia data comprises spoken speech of the text data and a video image matching the text data, the initial multimedia data comprising at least one multimedia segment, the at least one multimedia segment is respectively corresponding to at least one text segment divided from the text data, a target multimedia segment in the at least one multimedia segment is corresponding to a target text segment in the at least one text segment, the target multimedia segment comprises a target video segment and a target speech segment, the target video segment comprises a video image matching the target text segment, and the target speech segment comprises a spoken speech matching the target text segment: a target editing template obtaining module configured to obtain a target editing template in response to an editing template obtaining request: a target multimedia data generating module configured to apply an editing operation indicated by the target editing template to the initial multimedia data to obtain target multimedia data; and a target video generation module configured to generate a target video based on the target multimedia data.

According to one or more embodiments of the present disclosure, the present disclosure provides an apparatus for video generation, wherein the video image comprises subtitle text that matches the target text segment.

According to one or more embodiments of the present disclosure, the present disclosure provides an apparatus for video generation, wherein the target editing template obtaining module, in order to obtain the target editing template in response to the editing template obtaining request, comprises: a target editing template determination unit configured to in response to a triggering operation for a template theme control, determine an editing template corresponding to the triggering operation as the target editing template; and a target editing template obtaining unit configured to obtain the target editing template.

According to one or more embodiments of the present disclosure, the present disclosure provides an apparatus for video generation, wherein the target editing template obtaining module further comprises: a video editing area display unit configured to, before in response to the triggering operation of the editing template control, display a video editing area comprising a template control: a mask area display unit configured to display a mask area in response to a triggering operation of the template control and to display at least one template theme control on the mask area.

According to one or more embodiments of the present disclosure, the present disclosure provides an apparatus for video generation, wherein the editing operation indicated by the target editing template comprises a video synthesis operation; and the target multimedia data generation module is specifically configured to synthesize a video segment in the target editing template with the multimedia segments in the initial multimedia data based on the video synthesis operation to obtain the target multimedia data.

According to one or more embodiments of the present disclosure, the present disclosure provides an apparatus for video generation, wherein the target multimedia data generation module is specifically configured to load the video segment in the target editing template to a predetermined position of the multimedia segments in the initial multimedia data based on the video synthesis operation to obtain the target multimedia data, wherein the predetermined position comprises a position before the first frame of media data of the initial multimedia data and/or a position after the last frame of media data of the initial multimedia data.

According to one or more embodiments of the present disclosure, the present disclosure provides an apparatus for video generation, wherein the editing operation indicated by the target editing template comprises a transition setting operation; and the target multimedia data generation module is specifically configured to add a transition effect to the multimedia segment in the initial multimedia data based on the transition setting operation to obtain the target multimedia data.

According to one or more embodiments of the present disclosure, the present disclosure provides an apparatus for video generation, wherein the editing operation indicated by the target editing template comprises a virtual object addition operation; and the target multimedia data generation module is specifically configured to add a virtual object in the target editing template to a predetermined position of the initial multimedia data based on the virtual object addition operation to obtain the target multimedia data.

According to one or more embodiments of the present disclosure, the present disclosure provides an apparatus for video generation, wherein the editing operation indicated by the target editing template comprises a background audio addition operation; and the target multimedia data generation module is specifically configured to mix a background audio in the target editing template with the spoken speech in the initial multimedia data based on the background audio addition operation to obtain target multimedia data.

According to one or more embodiments of the present disclosure, the present disclosure provides an apparatus for video generation, wherein the editing operation indicated by the target editing template comprises a keyword extraction operation; and the target multimedia data generation module is specifically configured to extract a keyword from the at least one target text segment and to add the keyword to the target multimedia segment corresponding to the target text segment.

According to one or more embodiments of the present disclosure, the present disclosure provides an apparatus for video generation, wherein the target multimedia data generation module is specifically used to obtain key text information matching the keyword and to add the keyword and the key text information to the target multimedia segment corresponding to the target text segment.

According to one or more embodiments of the present disclosure, the present disclosure provides an electronic device comprising: one or more processors and a storage for storing one or more programs. When one or more programs are executed by one or more processors, causing one or more processors to implement any of the method of video generations provided in this disclosure.

According to one or more embodiments of the present disclosure, the present disclosure provides a computer-readable storage medium having a computer program stored thereon that, when executed by a processor, implements any of the method of video generations provided in the present disclosure.

The disclosed embodiments also provide a computer program product comprising a computer program or instructions that, when executed by a processor, implement a method of video generation as described above.

The above description is only the best embodiment of the present disclosure and an explanation of the technical principles used. Those skilled in the art should understand that the scope of the disclosure involved in this disclosure is not limited to technical solutions composed of specific combinations of the above technical features, but should also cover other technical solutions formed by arbitrary combinations of the above technical features or their equivalent features without departing from the above disclosure concept. For example, technical solutions formed by replacing the above features with (but not limited to) technical features with similar functions disclosed in this disclosure.

In addition, although various operations are depicted in a specific order, this should not be understood as requiring these operations to be performed in the specific order shown or in a sequential order. In certain environments, multitasking and parallel processing may be advantageous. Similarly, although several specific implementation details are comprised in the above discussion, these should not be construed as limiting the scope of the present disclosure. Certain features described in the context of individual embodiments may also be implemented in combination in a single embodiment. Conversely, various features described in the context of a single embodiment may also be implemented in a plurality of embodiments individually or in any suitable sub-combination.

Although the subject matter has been described in language specific to structural features and/or methodological logical actions, it should be understood that the subject matter defined in the appended claims is not necessarily limited to the specific features or actions described above. On the contrary, the specific features and actions described above are merely exemplary forms of implementing the claims.

We claim:

1. A method for video generation comprising:

generating initial multimedia data based on received text data, the initial multimedia data comprising spoken speech of the text data and a video image matching the text data, the initial multimedia data comprising at least one multimedia segment, the at least one multimedia segment respectively corresponding to at least one text segment divided from the text data, a target multimedia segment in the at least one multimedia segment corresponding to a target text segment in the at least one text segment, the target multimedia segment comprising a target video segment and a target speech segment, the target video segment comprising a video image matching the target text segment, and the target speech segment comprises a spoken speech matching the target text segment;

displaying a video editing area comprising a template control, wherein the template control is used to indicate editing the initial multimedia data using existing templates;

displaying a mask area in response to a triggering operation of the template control;

displaying at least one template theme control on the mask area;

in response to a triggering operation for a template theme control of the at least one template theme control, determining an editing template corresponding to the triggering operation as the target editing template;

obtaining the target editing template;

applying an editing operation indicated by the target editing template to the initial multimedia data to obtain target multimedia data; and generating a target video based on the target multimedia data.

2. The method of claim 1, wherein the video image comprises subtitle text matching the target text segment.

3. The method of claim 1, wherein the editing operation indicated by the target editing template comprises a video synthesis operation; and wherein applying an editing operation indicated by the target editing template to the initial multimedia data to obtain target multimedia data comprises:

synthesizing a video segment in the target editing template with the multimedia segments in the initial multimedia data based on the video synthesis operation to obtain the target multimedia data.

4. The method of claim 3, wherein synthesizing a video segment in the target editing template with the multimedia segments in the initial multimedia data based on the video synthesis operation to obtain the target multimedia data comprises:

loading the video segment in the target editing template to a predetermined position of the multimedia segments in the initial multimedia data based on the video synthesis operation to obtain the target multimedia data, wherein the predetermined position comprises a position before the first frame of media data of the initial multimedia data and/or a position after the last frame of media data of the initial multimedia data.

5. The method of claim 1, wherein the editing operation indicated by the target editing template comprises a transition setting operation; and wherein applying an editing operation indicated by the target editing template to the initial multimedia data to obtain target multimedia data comprises:

adding a transition effect to the multimedia segment in the initial multimedia data based on the transition setting operation to obtain the target multimedia data.

6. The method of claim 1, wherein the editing operation indicated by the target editing template comprises a virtual object addition operation; and wherein applying an editing operation indicated by the target editing template to the initial multimedia data to obtain target multimedia data comprises:

adding a virtual object in the target editing template to a predetermined position of the initial multimedia data based on the virtual object addition operation to obtain the target multimedia data.

7. The method of claim 1, wherein the editing operation indicated by the target editing template comprises a background audio addition operation; and wherein applying an editing operation indicated by the target editing template to the initial multimedia data to obtain target multimedia data comprises:

mixing a background audio in the target editing template with the spoken speech in the initial multimedia data based on the background audio addition operation to obtain target multimedia data.

8. The method of claim 1, wherein the editing operation indicated by the target editing template comprises a keyword extraction operation; and wherein applying an editing operation indicated by the target editing template to the initial multimedia data to obtain target multimedia data comprises:

extracting a keyword from the at least one target text segment; and adding the keyword to the target multimedia segment corresponding to the target text segment.

9. The method of claim 8, wherein adding the keyword to the target multimedia segment corresponding to the target text segment comprises:

obtaining key text information matching the keyword; and adding the keyword and the key text information to the target multimedia segment corresponding to the target text segment.

10. An electronic device comprising:

one or more processors; and a memory storing one or more programs thereon, the one or more programs, when executed by the one or more processors, causing the electronic device to:

generate initial multimedia data based on received text data, the initial multimedia data comprising spoken speech of the text data and a video image matching the text data, the initial multimedia data comprising at least one multimedia segment, the at least one multimedia segment respectively corresponding to at least one text segment divided from the text data, a target multimedia segment in the at least one multimedia segment corresponding to a target text segment in the at least one text segment, the target multimedia segment comprising a target video segment and a target speech segment, the target video segment comprising a video image matching the target text segment, and the target speech segment comprises a spoken speech matching the target text segment;

display a video editing area comprising a template control, wherein the template control is used to indicate editing the initial multimedia data using existing templates;

display a mask area in response to a triggering operation of the template control;

display at least one template theme control on the mask area;

in response to a triggering operation for a template theme control of the at least one template theme control, determine an editing template corresponding to the triggering operation as the target editing template;

obtain the target editing template;

apply an editing operation indicated by the target editing template to the initial multimedia data to obtain target multimedia data; and generate a target video based on the target multimedia data.

11. The electronic device of claim 10, wherein the video image comprises subtitle text matching the target text segment.

12. The electronic device of claim 10, wherein the editing operation indicated by the target editing template comprises a video synthesis operation; and wherein the one or more programs, when executed by the one or more processors, cause the electronic device to apply an editing operation indicated by the target editing template to the initial multimedia data to obtain target multimedia data by:

synthesizing a video segment in the target editing template with the multimedia segments in the initial multimedia data based on the video synthesis operation to obtain the target multimedia data.

13. The electronic device of claim 12, wherein the one or more programs, when executed by the one or more processors, cause the electronic device to synthesize a video segment in the target editing template with the multimedia segments in the initial multimedia data based on the video synthesis operation to obtain the target multimedia data by:

loading the video segment in the target editing template to a predetermined position of the multimedia segments in the initial multimedia data based on the video synthesis operation to obtain the target multimedia data, wherein the predetermined position comprises a position before the first frame of media data of the initial multimedia data and/or a position after the last frame of media data of the initial multimedia data.

14. The electronic device of claim 10, wherein the editing operation indicated by the target editing template comprises a transition setting operation; and wherein the one or more programs, when executed by the one or more processors, cause the electronic device to apply an editing operation indicated by the target editing template to the initial multimedia data to obtain target multimedia data by:

adding a transition effect to the multimedia segment in the initial multimedia data based on the transition setting operation to obtain the target multimedia data.

15. The electronic device of claim 10, wherein the editing operation indicated by the target editing template comprises a virtual object addition operation; and wherein the one or more programs, when executed by the one or more processors, cause the electronic device to apply an editing operation indicated by the target editing template to the initial multimedia data to obtain target multimedia data by:

adding a virtual object in the target editing template to a predetermined position of the initial multimedia data based on the virtual object addition operation to obtain the target multimedia data.

16. A non-transitory computer-readable storage medium storing a computer program thereon, the program, when executed by a processor, implementing:

generating initial multimedia data based on received text data, the initial multimedia data comprising spoken speech of the text data and a video image matching the text data, the initial multimedia data comprising at least one multimedia segment, the at least one multimedia segment respectively corresponding to at least one text segment divided from the text data, a target multimedia segment in the at least one multimedia segment corresponding to a target text segment in the at least one text segment, the target multimedia segment comprising a target video segment and a target speech segment, the target video segment comprising a video image matching the target text segment, and the target speech segment comprises a spoken speech matching the target text segment;

displaying a video editing area comprising a template control, wherein the template control is used to indicate editing the initial multimedia data using existing templates;

displaying a mask area in response to a triggering operation of the template control;

displaying at least one template theme control on the mask area;

in response to a triggering operation for a template theme control of the at least one template theme control, determining an editing template corresponding to the triggering operation as the target editing template;

applying an editing operation indicated by the target editing template to the initial multimedia data to obtain target multimedia data; and generating a target video based on the target multimedia data.

* * * * *